July 18, 1950 D. A. WALLACE ET AL 2,515,749
FRUIT JUICE EXTRACTING MACHINE
Filed May 18, 1946 3 Sheets-Sheet 3

INVENTORS.
David A. Wallace,
Raymond E. Hewlett.
BY Robert E. Harris
ATTORNEY.

Patented July 18, 1950

2,515,749

UNITED STATES PATENT OFFICE 2,515,749

FRUIT JUICE EXTRACTING MACHINE

David A. Wallace, Grosse Pointe Farms, and Raymond E. Hewlett, Detroit, Mich., assignors to Hewlett Manufacturing Company, Detroit, Mich., a corporation of Michigan Application May 18, 1946, Serial No. 670,732

6 Claims. (Cl. 100—47)

This invention relates to apparatus for extracting juices from fruits.

It is an object of this invention to provide an apparatus for this purpose that is simple in construction and adapted to seize the fruit and transport it to cutting means which severs the fruit so that it is in its most advantageous condition for juice extraction. The fruit segments are then crushed by forced movement through a passage of decreasing height and the waste elements ejected.

A further object is to provide a device having two compartments substantially sealed against the passage of liquid therebetween. The first compartment contains the fruit transporting, slicing and squeezing apparatus and the second compartment contains the driving mechanism for said apparatus. Flushing out of the first compartment with water for reasons of cleanliness is thus possible.

Figure 1:
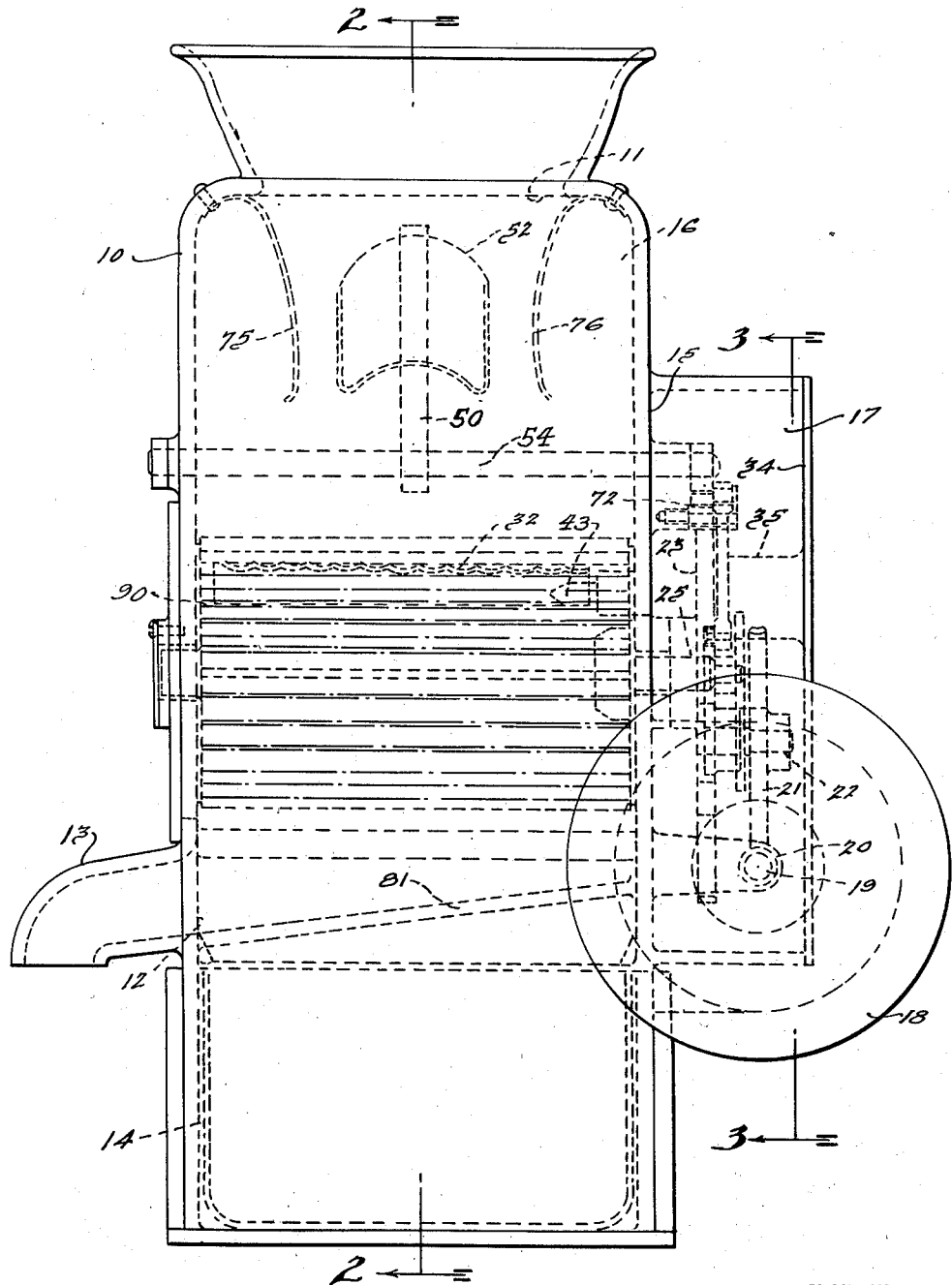
Figure 1 is an elevational view of the device.

A housing 10 forms the case within which the apparatus is retained. Housing 10 contains an inlet orifice 11 in its upper surface. A discharge orifice 12 is provided in the lower portion of one of the side walls. A conventional spout 13 is preferably connected to housing 10 adjacent orifice 12. Fruit enters the device through orifice 11 and juices are discharged through spout 13. An open top drawer 14 is slidably mounted in the base of housing 10 and is adapted to receive the substantially solid waste elements such as rind and seeds.

The housing 10 is divided vertically by wall 15 into two compartments 16 and 17. A liquid seal between the compartments is preferably provided by wall 15. Compartment 16 houses the mechanical elements which come into direct contact with the fruit. The orifices 11 and 12 lead into and out of compartment 16 and the path of travel of the fruit is wholly contained in compartment 16. Compartment 17 houses the driving means for the mechanical elements of compartment 16.

The source of power for the operation of the device is preferably an electric motor 18 which is mounted on housing 10 with its rotor axis in a horizontal plane and which has the rotor shaft 19 thereof penetrating compartment 17. It is to be understood however that if desired a crank could be substituted for motor 18 for manual operation of the device. Other forms of power drive could also be substituted.

Figure 3:
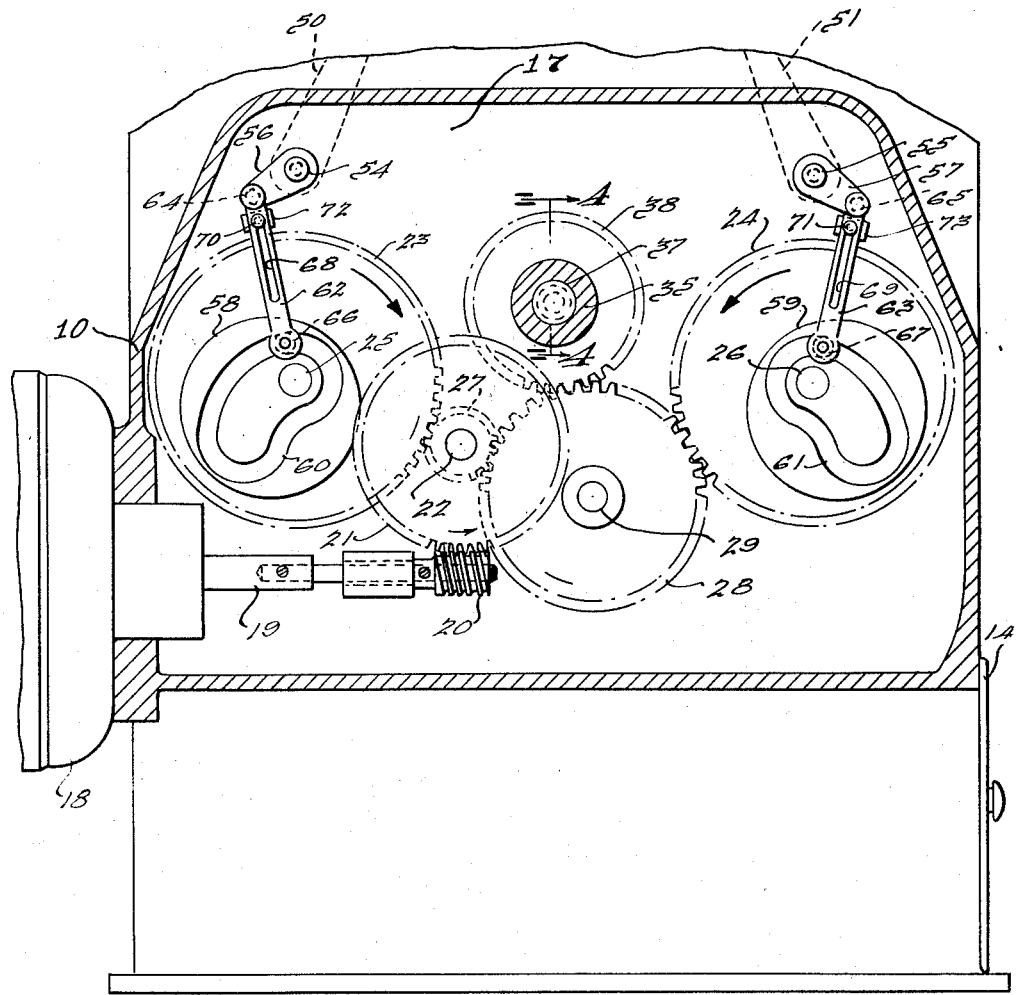
Figure 3 is a vertical section on the line 3—3 of Figure 1.

A worm 20 is keyed to rotor shaft 19 and adapted to mesh with a worm wheel 21 keyed to a shaft 22 which is rotatably mounted in housing 10. A pair of symmetrically disposed pinions 23 and 24 are keyed to parallel shafts 25 and 26 which are rotatably mounted in housing 10 parallel to shaft 22. Means to cause the rotation of shaft 22 to drive pinions 23 and 24 in opposite directions at similar speeds are provided. A small pinion 27 is keyed to shaft 22 and adapted to mesh with and drive pinion 23. A pinion 28 is keyed to a shaft 29 rotatably mounted in housing 10 parallel to shafts 22, 25 and 26. Pinion 28 is adapted to mesh with and drive pinion 24. Thus, for example, in Figure 3 if pinion 24 rotates in a counterclockwise direction its partner, pinion 23, will be rotated in a clockwise direction. A pair of cylindrical rollers 30 and 31 positioned in compartment 16 are also keyed to shafts 25 and 26. The function to be performed by rollers 30 and 31 will be described in more detail herein.

Figure 4:
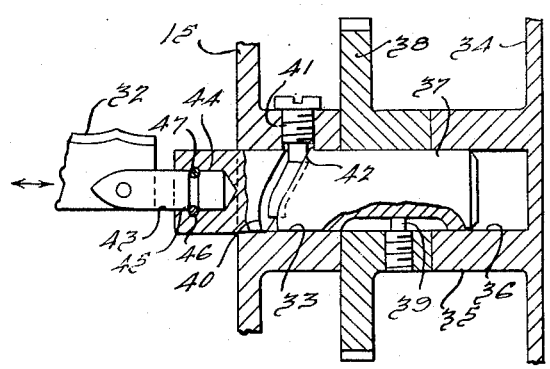
Figure 4 is a vertical section on the line 4—4 of Figure 3.

A knife 32 is positioned transversely of compartment 16 and is reciprocated by means to be described herein. The wall 15 of housing 10 has cylindrical hole 33 formed therein on an axis parallel to the knife 32. The cover plate 34 has an extension 35 provided with a cylindrical recess 36 aligned with hole 33. A shaft 37 is rotatably and slidably mounted in said hole and recess (see Figure 4). A pinion 38 is keyed at 39 to shaft 37 but the keyway permits relative axial movement. Pinion 38 meshes with and is driven by pinion 28. Shaft 37 has a cam slot 40 formed around its periphery. Screw 41 secured to housing wall 15 has a smooth cylindrical end portion 42 adapted to ride in cam slot 40. A link 43 is fastened to knife 32 and rotatably mounted on shaft 37 co-axially therewith at 44 but restrained against relative axial movement by slots 45 and 46 in link 43 and shaft 37 and snap ring 47. Knife 32 is slidably mounted but restrained against rotation by means to be described herein. In operation when pinion 28 rotates pinion 38 shaft 37 is rotated. This rotation is not transmitted to knife 32 or link 43. Screw 41 riding in cam slot 40 of rotating shaft 37 induces reciprocation of shaft 37, link 43 and knife 32.

A pair of fingers 50 and 51 having concave plates 52 and 53 affixed to their lower surfaces is adapted to receive an entering fruit and force it into engagement with the knife 32 in a manner to be described herein. Finger 50 is keyed to a shaft 54 and finger 51 is keyed to a shaft 55. Means have been provided to oscillate the fingers through a limited arc so that they may repeat their function as additional fruit enters housing 10. Arms 56 and 57 are also keyed to shafts 54 and 55. A pair of eccentrics 58 and 59 are keyed to shafts 25 and 26 and rotated therewith. The eccentrics have continuous inverse cam slots 60 and 61 formed in flat surfaces thereof. Connecting rods 62 and 63 are rotatably mounted on arms 56 and 57 at 64 and 65 and have on the opposite ends thereof pins 66 and 67 adapted to ride in slots 60 and 61. The arms 62 and 63 are provided with longitudinal slots 68 and 69. A pair of pins 70 and 71 mounted on plates 72 and 73 fastened to wall 15 of housing 10 cooperate with slots 68 and 69 to form the fulcrums about which arms 62 and 63 oscillate. In operation the rotation of shafts 25 and 26 through eccentrics 58 and 59, cam slots 60 and 61, arms 62 and 63, arms 56 and 57 and shafts 54 and 55 cause fingers 50 and 51 to oscillate through the positions shown in broken lines in Figure 2 and back to their upper position to repeat the movement.

Figure 2:
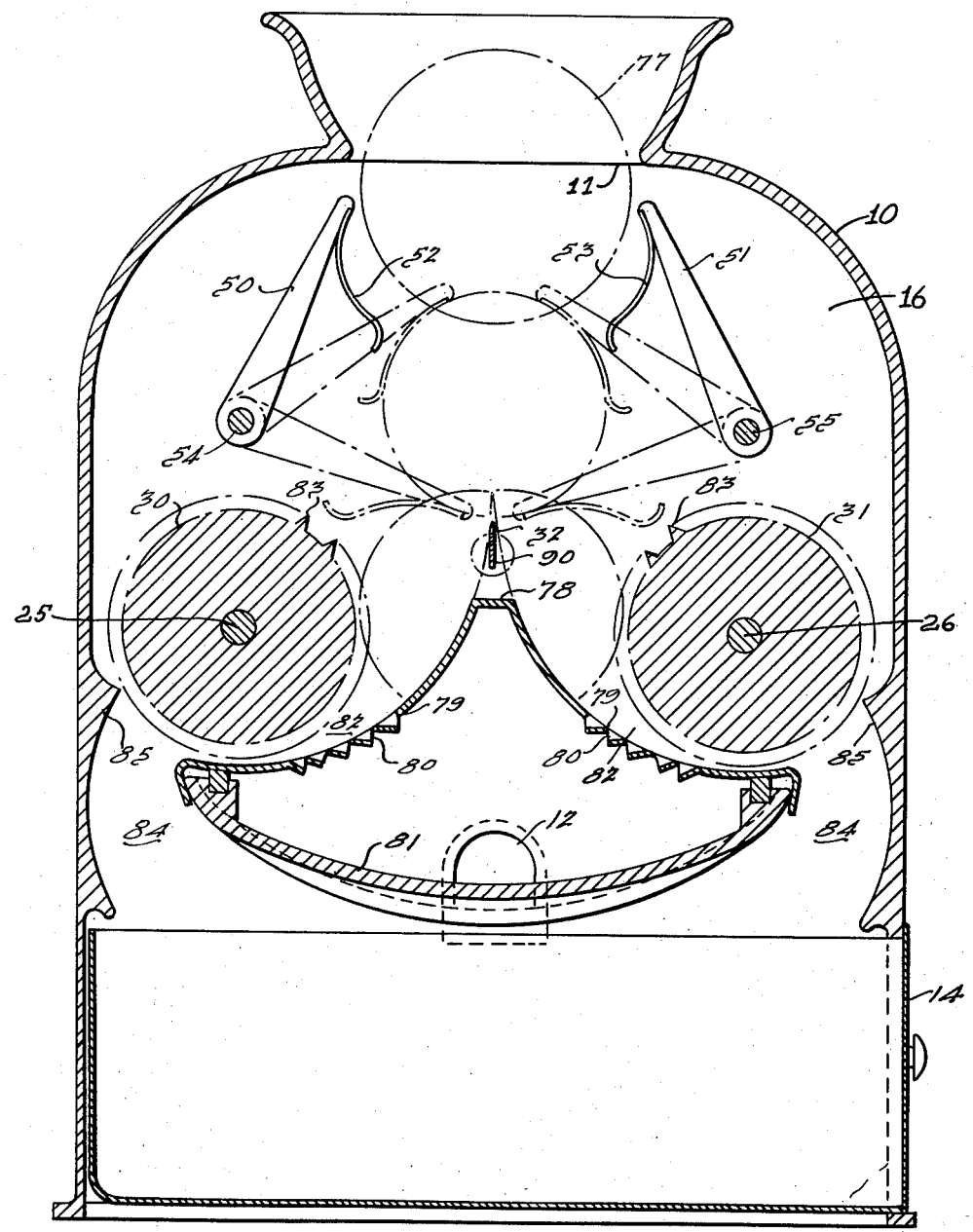
Figure 2 is a vertical section on the line 2—2 of Figure 1.

Referring to Figures 1 and 2 the apparatus in compartment 16 which directly engages the fruit will be described. A pair of depending guide elements 75 and 76 fastened to housing 10 on opposite sides of orifice 11 guide the entering fruit 77 so that it will be received by the concave plates 52 and 53 of fingers 50 and 51 which position the fruit for engagement by fingers 50 and 51. Plates 52 and 53 relinquish the fruit by sliding to the upper portion thereof as the fingers move downward. Disposed transversely of the path thus assumed by the fruit is the reciprocating knife 32 which severs it into two hemispherical segments. A spreader, generally designated by the numeral 78 is located generally below the knife 32 and comprises a pair of intersecting concave sieve elements 79 which are adapted to separate pulp and other substantially solid matter from extracted juices by permitting juice to drain through openings 80 therein. The spaced lower edges of the sieves are connected by an inclined trough 81 mounted below sieves 79. Trough 81 is adapted to discharge juices from the orifice 12 provided in housing 10. The spreader 78 is preferably formed with a slot 90 extending transversely thereof along the line of intersection of the concave sieve elements 79. The knife 32 is slidably mounted in slot 90.

The means which cooperates with sieves 79 to extract juice from the hemispherical fruit segments is cylindrical rollers 30 and 31. The relation between the rollers and sieves is important and the concave sieve elements 79 referred to above are supported by trough 81 and the lower end portion of each sieve is arcuately curved beneath one of the rollers 30 and 31, respectively. Each sieve 79 is so shaped and disposed as to form a chamber 82 of gradually decreasing width between it and the roller with which it is mounted. The fruit segments are received from knife 32 by rollers 30 and 31 and moved into chamber 82 and over the face of sieve 79. The outer periphery of rollers 30 and 31 are provided with sharp protruding elements 83 which are adapted to firmly engage the fruit. These elements have been illustrated as longitudinal knife edges spaced circumferentially about the cylindrical rollers although it is to be understood that they could have other forms as, for example, a plurality of pointed, spike-like protrusions. As the fruit segment is moved through the chamber 82 it is progressively flattened and crushed and the rind is finally squeezed between the roller and the lower arcuate part of the adjacent sieve.

The drawer 14 has been provided as a receptacle for the accumulation of waste, including rinds and seeds. When the rind is finally squeezed between the roller and the lower arcuate part of the adjacent sieve it drops by gravity through passage 84 into drawer 14. Protrusions 85 on the interior surface of the walls of housing 10 are disposed in close relation to rollers 30 and 31 so that if any fruit segments fail to drop by gravity into passage 84 due to the fact that they have been impaled on the protruding elements 83 the segments will engage protrusion 85 and be forced off elements 83 to drop into passage 84 and drawer 14. Drawer 14 may be emptied periodically.

We claim:

1. In a device for extracting juices from fruits the combination of means to sever said fruit into segments, means to receive each fruit segment from said first means and extract juice therefrom, and a pair of elements adapted to oscillate from a first fruit receiving position to a second position in which the fruit is engaged by said severing means and back to said first position to receive additional fruit, said pair of elements being so constructed and arranged as to present a space therebetween through which a fruit may pass when the elements are in said first position and to cooperate to approach each other behind the fruit and push it toward said severing means as an incident to their movement to said second position.

2. In a device for extracting juices from fruits the combination of means to sever fruit into segments, means to receive each fruit segment from said first means and extract juice therefrom, a pair of fingers rotatably mounted upon parallel axes, said fingers being normally inclined upwardly and toward each other, and means to rotate said fingers downward through a limited arc whereby they engage the upper surface of said fruit and as they rotate force said fruit into engagement with said severing means.

3. In a fruit juice extracting device the combination of a pair inverse cam elements, means to rotate said cam elements in opposite directions, fruit severing means, fruit crushing means, a pair of inclined fingers adapted to engage a fruit and force it into contact with said severing means, and means to cause rotation of said cam elements to oscillate said fingers from a first position to a position relatively closer to said severing means.

4. In a device for extracting juices from fruit a knife adapted to cut fruit into segments, means to reciprocate said knife, means to receive each fruit segment from said knife and extract juice therefrom, a pair of fingers rotatably mounted upon parallel axes and adapted to oscillate between first and second positions, and means to oscillate said fingers, the ends of said fingers opposite said axes having considerable space therebetween in said first position whereby a fruit may pass between said fingers in preparation for engagement by said fingers on the surface thereof farthest from said knife when said fingers are oscillated, said ends of said fingers having relatively little space therebetween in intermediate positions and said second position being adjacent said knife so that the fruit is forced over said knife.

5. In a device for extracting juices from fruits the combination of concave sieve members intersecting in a straight line, a knife slidably mounted adjacent said line, means to reciprocate said knife, a pair of cylindrical rollers rotatably mounted on their longitudinal axes, said axes being parallel to said line, each of said rollers being positioned adjacent one of said sieve members and positioned relatively distant from its associated sieve member in the vicinity of said line and relatively close to its associated sieve member near the extremity of the associated sieve member remote from said line, means to rotate said rollers whereby fruit segments are crushed between said rollers and said sieve members, and means to deliver fruit to said knife and the segments to said rollers.

6. In a device for extracting juices from fruits the combination of concave sieve members intersecting in a straight line, a knife slidably mounted adjacent said line, means to reciprocate said knife, a pair of cylindrical rollers rotatably mounted on their longitudinal axes, said axes being parallel to said line, each of said rollers being positioned adjacent one of said sieve members and positioned relatively distant from its associated sieve member in the vicinity of said line and relatively close to its associated sieve member near the extremity of the associated sieve member remote from said line, means to rotate said rollers whereby fruit segments are crushed between said rollers and said sieve members, and means adapted to oscillate from a first fruit receiving position to a second position in which the fruit is severed into segments by said knife and the segments engaged by said rollers.

DAVID A. WALLACE.
RAYMOND E. HEWLETT.

REFERENCES CITED

The following references are of record in the file of this patent:

UNITED STATES PATENTS

| Number | Name | Date |
| --- | --- | --- |
| 621,773 | Blatz | Mar. 21, 1899 |
| 765,005 | Gregory | July 12, 1904 |
| 1,159,187 | Day | Nov. 2, 1915 |
| 1,620,551 | Hughes | Mar. 8, 1927 |
| 2,067,555 | Walker | Jan. 12, 1937 |
| 2,078,737 | Segovia | Apr. 27, 1937 |
| 2,205,059 | Clark | June 18, 1940 |
| 2,212,066 | Fry | Aug. 20, 1940 |
| 2,270,007 | McKinnis | Jan. 13, 1942 |
| 2,311,565 | Nelson | Feb. 16, 1943 |
| 2,332,177 | Smith | Oct. 19, 1943 |
| 2,382,620 | Eastman | Aug. 14, 1945 |
| 2,479,194 | Eastman | Aug. 16, 1949 |